United States Patent [19]
Jarrett et al.

[11] Patent Number: 6,112,642
[45] Date of Patent: Sep. 5, 2000

[54] METHOD AND APPARATUS FOR MAKING A TWO PIECE UNITARY PISTON

[75] Inventors: Mark W. Jarrett, Morton; Werner H. Koeslin, Peoria; Robert L. Weber, Lacon, all of Ill.

[73] Assignee: Caterpillar Inc., Peoria, Ill.

[21] Appl. No.: 09/168,396

[22] Filed: Oct. 6, 1998

[51] Int. Cl.$^7$ .................................................. F01B 31/08
[52] U.S. Cl. .............................. 92/186; 92/231; 92/260; 29/888.042; 29/888.044
[58] Field of Search ........................... 92/186, 231, 260; 123/193.6, 193.4; 29/888.04, 888.042, 888.044

[56] References Cited

U.S. PATENT DOCUMENTS

| | | | |
|---|---|---|---|
| 3,877,351 | 4/1975 | Barfiss | 92/220 |
| 3,974,381 | 8/1976 | Rohrle et al. | 250/310 |
| 4,286,505 | 9/1981 | Amdall | 92/186 |
| 4,346,646 | 8/1982 | Ellermann | 92/220 |
| 5,040,454 | 8/1991 | Ballheimer et al. | 92/177 |
| 5,245,752 | 9/1993 | Lippai et al. | 29/888.042 |
| 5,359,922 | 11/1994 | Leites et al. | 92/189 |
| 6,032,619 | 3/2000 | Zhu et al. | 123/41.35 |

*Primary Examiner*—Edward K. Look
*Assistant Examiner*—Thomas E. Lazo
*Attorney, Agent, or Firm*—Larry G. Cain

[57] ABSTRACT

Past pistons have been susceptible to reduced longevity due to increased forces of combustion thereon during operating cycles of an engine. The present two piece unitary piston increases the longevity of pistons used with increased forces of combustion. For example, a head member has a crown portion defining a ring band portion having a bottom surface and a support portion. And, a skirt member defines a ring band support surface and a mating portion. The head member and the skirt member have a preestablished material strength being generally the same. The head member and the skirt member are joined at an interface of the support portion and the mating portion by an interference fit and are joined at the interface of the bottom surface and the ring band support surface by a weld. The force of combustion acting on the crown portion is resisted by the ring band support surface being in contacting relationship with the bottom surface. Thus, the skirt member structure supports and resists the bending moment of the combustion forces on the head member.

20 Claims, 5 Drawing Sheets

Fig_1_

Fig_2_

Fig_3

Fig-4

METHOD AND APPARATUS FOR MAKING A TWO PIECE UNITARY PISTON

TECHNICAL FIELD

This invention relates generally to an engine and more particularly to a method and apparatus for making a piston used in the engine.

BACKGROUND ART

The development of engines over the past few years have included increasing the horse power without increasing the displacement of the engine. To obtain the increased horsepower, it has been necessary to increase the combustion pressures within the combustion chamber which are transferred through the piston into the connecting rod and crankshaft.

Such increase in pressures have required the improvement of the integrity of the piston to withstand the increased stresses thereon. In the past and in many cases today, such pistons are made of aluminum or cast iron. Or, in some applications have used an articulated piston having a steel head and an aluminum skirt. Such an example is shown in U.S. Pat. No. 5,040,454 issued on Aug. 20, 1991 to Benny Ballheimer and Stephen G. Shoop.

As the pressures of engine designs increase, further requirements for the improvement of the integrity of the piston to withstand the increasing stresses thereon has become more apparent. As the pressures increase and consequently the stresses increase attempts have been made to resist, for example, bending stresses. One such example, is shown in U.S. Pat. No. 3,877,351 issued Apr. 15, 1975 to Eugen Barfiss. A ring zone of an upper part being made of steel and being supported by a lower part consisting of an aluminum alloy. The upper part and the lower part are joined by a bolted connection in a removable method of attachment. Additionally, U.S. Pat. No. 4,346,646 issued Aug. 31, 1982 to Jurgen Ellermann discloses a crown of steel being connected with a piston body of aluminum. An annular skirt supports the piston body. The crown and the piston body are joined by a bolted connection in a removable method of attachment.

Other piston assemblies are joined in a fixed manner such as by welding. For example, U.S. Pat. No. 5,359,922 issued Nov. 1, 1994 to Jose M. Martins Leites et. al. discloses a method of manufacturing an articulated piston head wherein two portions are joined by friction welding. U.S. Pat. No. 5,245,752 issued Sep. 21, 1993 to Andre Lippai et. al. discloses a two-piece piston having two portions friction welded together, U.S. Pat. No. 4,286,505 issued Sep. 1, 1981 to John K. Amdall discloses a two piece piston being joined by a brazing process, and U.S. Pat. No. 3,974,381 issued Aug. 10, 1976 to Manfred Rohrle, et. al. discloses a method of welding a workpiece including electron beam welding.

However, in many applications, the complexity of the piston design increases the cost of manufacturing. For example, with some welded designs flash occurs which can separate and contaminate the lubricating and cooling liquid and in other welded designs the position of the weld joint is difficult or nearly impossible to attain. And, with some bolted joints, additional strength is required at the bolted joint requiring additional parts and assembly time.

The present invention is directed to overcoming one or more of the problems as set forth above.

DISCLOSURE OF THE INVENTION

In one aspect of the invention a two piece unitary piston is adapted for use with an engine. The two piece unitary piston is comprised of a head member being made of a material having a preestablished material strength. A crown portion to which is connected a ring band portion defines a bottom surface. A support portion defines a support surface having a preestablished surface area and an intermediate diameter having a preestablished value. A skirt member is made of a material having a preestablished material strength being substantially the same as the preestablished material strength of said head member. A ring band support surface is aligned with the bottom surface forming an interface. A mating portion defines a support surface being in contacting and supporting relationship with the support surface of the head member. And, an intermediate diameter has a preestablished value. The intermediate diameter of the head member and the intermediate diameter of the skirt member form an interference fit. And, the interface formed by the ring band support surface being aligned with the bottom surface being joined by a welding process.

In another aspect of the invention a method of making a two piece unitary piston is comprising of the following steps. Forming a head member having a bottom surface and a support portion defining an intermediate diameter. Forming a skirt member having a ring band support surface and a support portion defining an intermediate diameter. Positioning the intermediate diameter of the head member in interference fitting relationship with the intermediate diameter of the skirt member. Positioning the support surface of the head member in contacting and supporting relationship with the support surface of the skirt member. Positioning the bottom surface in contacting relationship to the ring band support surface forming an interface. And, welding the interface of the bottom surface and the ring band support surface.

BEST MODE FOR CARRYING OUT THE INVENTION

Figure 1:
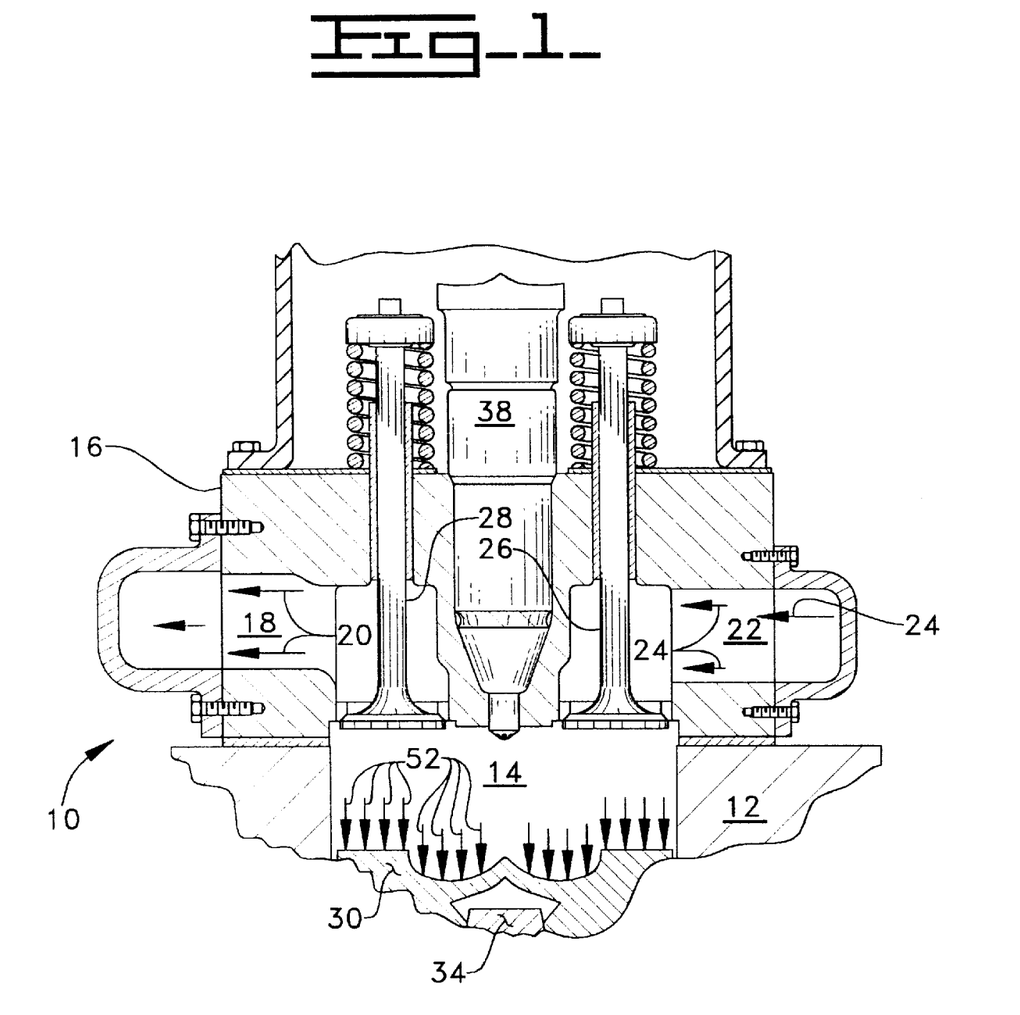
FIG. 1 is a partially sectioned view of an engine embodying the present invention.

Referring to FIG. 1, an engine 10 includes a block 12 having a plurality of cylinders 14 therein, of which only one is shown, and a head 16 is attached to the block 12. The head 16 includes an exhaust passage 18, having a flow of exhaust gas designated by the arrows 20 therein, and an intake passage 22, having a flow of intake air designated by the arrows 24 therein. An intake valve 26, or in this application a pair of intake valves, are interposed the intake passage 22 and the respective one of the plurality of cylinders 14. A pair of exhaust valves 28 are interposed the exhaust passage 18 and the respective one of the plurality of cylinders 14.

Figure 2:
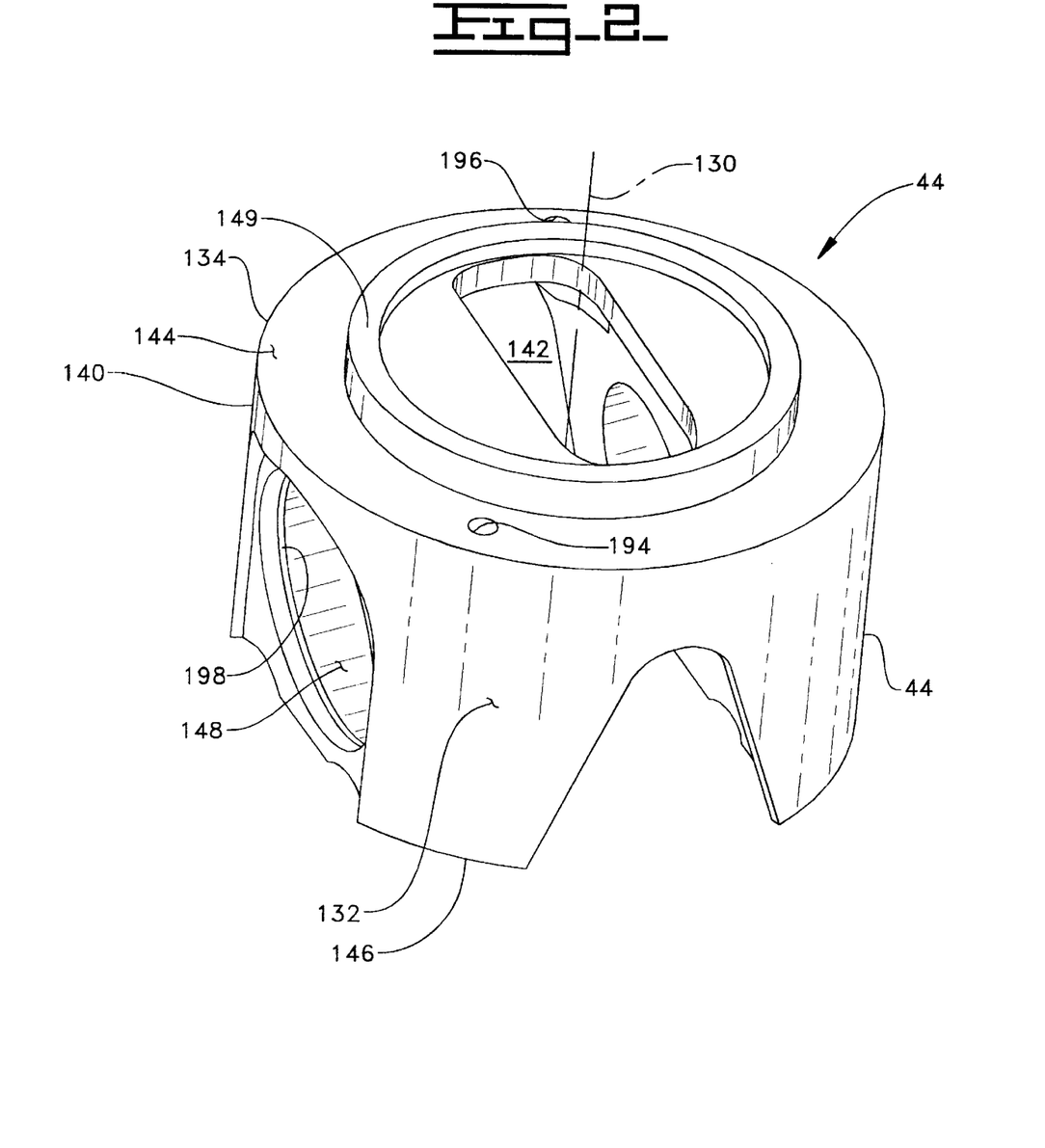
FIG. 2 is an isometric sectioned view of one piece of a two piece unitary piston.
Figure 3:
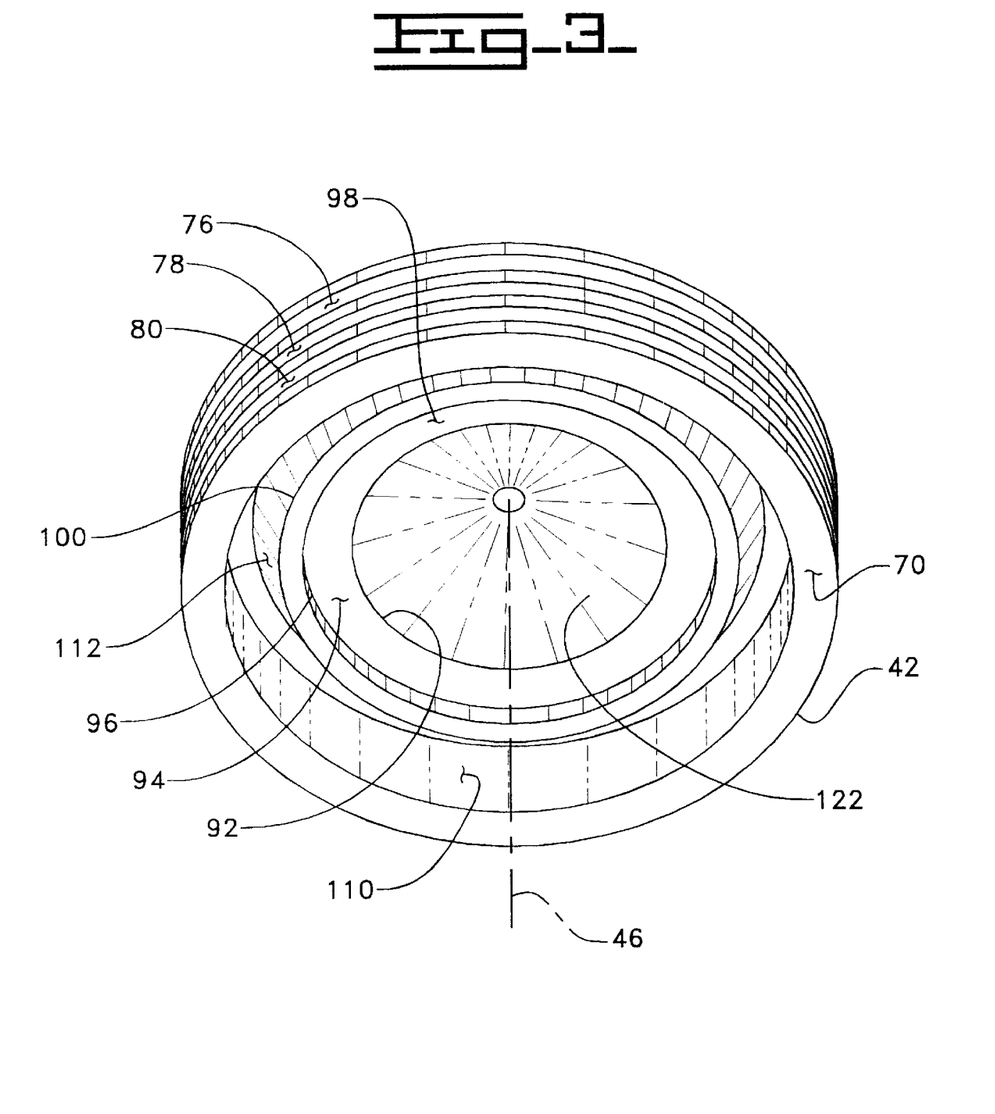
FIG. 3 is an isometric sectioned view of the other piece of the two piece unitary piston.
Figure 4:
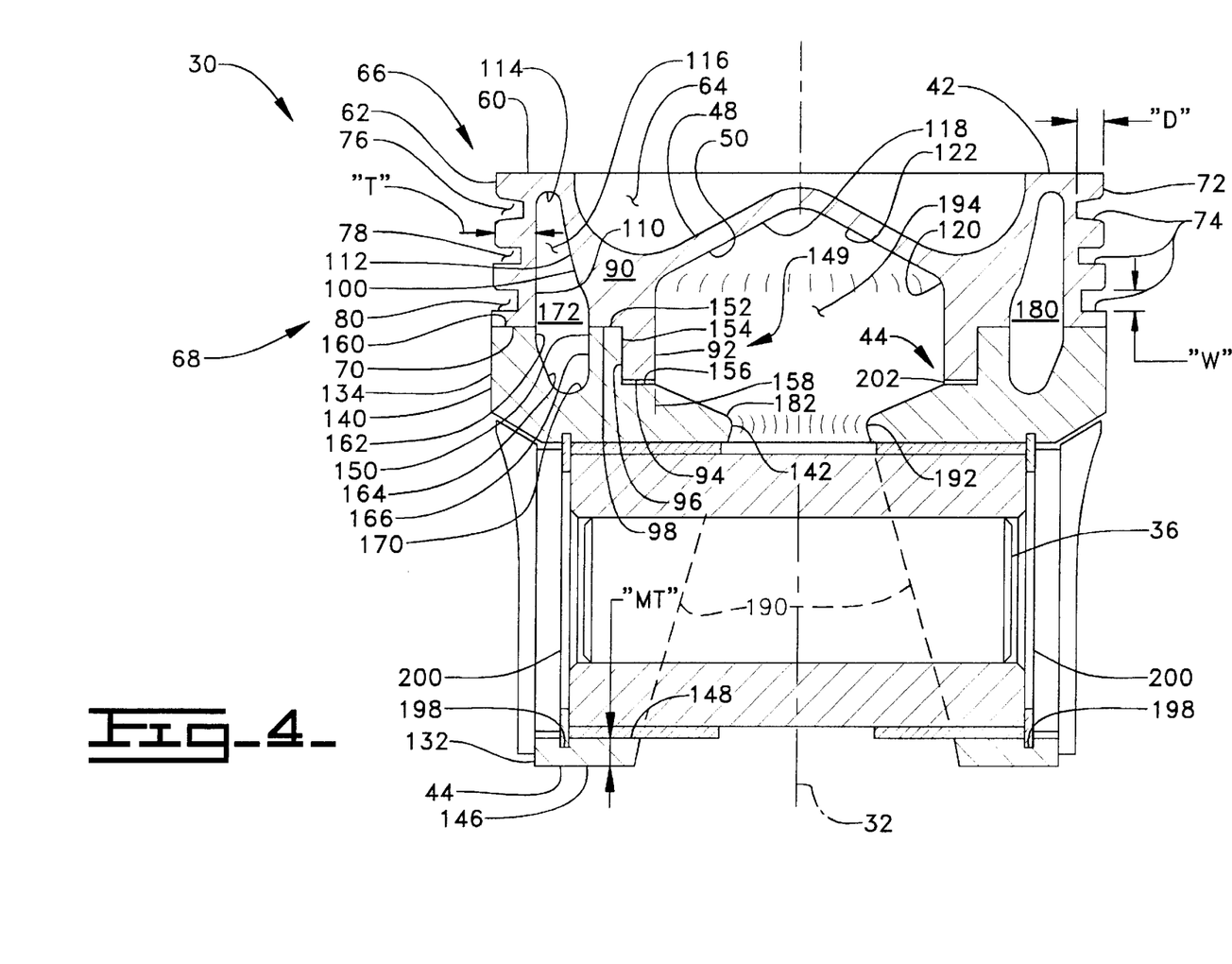
FIG. 4 is an isometric sectioned view of the assembled two piece unitary piston.

As further shown in FIGS. 2, 3 and 4, positioned in each of the plurality of cylinders 14 is a two piece unitary piston 30 defining an axis 32. A connecting rod 34 is attached to the two piece unitary piston 30 in a conventional manner by a wrist pin 36. A conventional fuel system 38 operatively communicates with the respective cylinder 14 in a conventional manner.

The two piece unitary piston 30 includes a first piece or head member 42 being fixedly attached to a second piece or skirt member 44. The head member 42 is made of a steel forging or casting having a preestablished structural strength and/or grain flow. The head member 42 has a generally cylindrical configuration having an axis 46 being synonymous with the axis 32 of the two piece unitary piston 30. The head member 42 defines a combustion side 48 and a cooling side 50 being spaced from the combustion side 48 a preestablished distance. As shown in FIG. 1, the combustion side 48 has a force of combustion, represented by the arrows 52, applied thereto. The combustion side 48 defines a crown portion 60 located radially near an extremity 62 of the head member 42. Located radially inward from the crown portion 60 is a crater portion 64 which in this application has a Mexican hat design or configuration. Extending axially from the crown portion 60 a preestablished distance is a ring band portion 66 having a preestablished thickness "T" thereof. The ring band portion 66 defines a land surface 68 and terminates at a lower extremity or bottom surface 70. The bottom surface 70 has a preestablished surface area. Positioned along the ring band portion 66 and extending a preestablished distance from the crown portion 60 toward the bottom surface 70 is a top land 72. Extending axially along the ring band portion 66 from the top land 72 toward the bottom surface 70, in a respective order, is a plurality of ring grooves 74. The plurality of ring grooves 74 define a preestablished width "W" and a preestablished depth "D". The plurality of ring grooves 74 define a first ring groove 76, a second ring groove 78 interposed the first ring groove 66 and the bottom surface 70 and a third ring groove 80 interposed the second ring groove 78 and the bottom surface 70.

The cooling side 50 includes a support portion 90 being radially spaced inwardly from the ring band portion 66. An inner diameter 92 defines the inner extremity of the support portion 90. Extending radially outward from the inner diameter 92 a preestablished distance is a first surface 94 being axially positioned below the bottom surface 70. Extending axially upward from the first surface 94 a predetermined distance is an intermediate diameter 96, defining a preestablished value, which terminates at a support surface 98. The support surface 98 extends radially outward from the intermediate diameter 96 to an outer diameter 100. The support surface 98 has a preestablished surface area. Thus, the support portion 90 has a stepped configuration. In this application, the bottom surface 70 is axially aligned with support surface 98. The cooling side 50 further includes a ring cooling surface or first cooling surface 110. In this application, the ring cooling surface 110 is generally parallel with the land surface 68. The ring cooling surface 110 is spaced from the land surface 68 a preestablished distance which defines the preestablished thickness "T" of the ring band portion 66. The ring cooling surface 110 extends axially upwardly from the bottom surface 70 toward the crown portion 60. Spaced from the ring cooling surface 110 is a gallery or second cooling surface 112. The gallery cooling surface 112 extends upwardly from the outer diameter 100 of the support surface 98 toward the crown portion 60. An upper arcuate cooling surface 114 is positioned a preestablished distance from the crown portion 60 and connects the ring cooling surface 110 with the gallery cooling surface 112. A head ring cooling gallery 116 is defined within the ring cooling surface 110, the upper arcuate cooling surface 114 and the gallery cooling surface 112. An undercrown cooling surface 118 is spaced from a portion of the crater portion 64 a preestablished uniform thickness. The undercrown cooling surface 118, in this application, has a generally frustoconical configuration defining a base member 120 extending along the inner diameter 92 and a cone member 122 extending from the base member 120 toward the crater portion 64.

The skirt member 44 is made of a steel forging or a casting and defines a preestablished structural strength and/or grain flow. The structural strength of the head member 42 and the skirt member 44 are substantially the same. The skirt member 44 has a generally cylindrical configuration and defines an axis 130 being synonymous with the axis 32 of the two piece unitary piston 30 and the axis 46 of the head member 42. The skirt member 44 includes a strut portion 132 and a base portion 134. The skirt member 44 is defined by an outer extremity 140, an inner extremity 142 having a generally frustoconical configuration with a flattened peak or top, a support portion 144 and a lower surface 146.

The base portion 134 extends from the support portion 144 toward the lower surface 146 a preestablished distance defined by an upper extremity of a radius of a bore 148 extending within the outer extremity 140 of the skirt member 44. The bore 148 is perpendicular to the axis 32 of the two piece unitary piston 30, the axis 46 of the head member 42 and the axis 130 of the skirt member 44. The support portion 144 includes a mating portion 149. The mating portion 149 is defined by an outer diameter 150 being equivalent to that of the outer diameter 100 of the support portion 90. A support surface 152 extends radially inward a preestablished distance from the outer diameter 150 to an intermediate diameter 154, defining a preestablished value, and defines a preestablished surface area being substantially equal to the preestablished surface area of the support surface 98 of the head member 42. The intermediate diameter 154 extends axially downward to a first surface 156 which extends radially inward a preestablished distance to an inner diameter 158. The inner diameter 158 of the skirt member 44 is generally axially aligned with the inner diameter 92 of the support portion 90 of the head member 42. Thus, the mating portion 149 has a stepped configuration which forms an interference or press fit with the stepped configuration of the support portion 90 of the head member 42. The support surface 98 of the head member 42 and the support surface 152 of the skirt member 44 are in contacting relationship. And, the intermediate diameter 96 of the head member 42 is substantially axially aligned with the intermediate diameter 154 of the skirt member 44. The support portion 144 further includes a ring band support surface 160. The ring band support surface is spaced in axial alignment with the support surface 152 and radially spaced from the support surface 152. The ring band support surface 160 is positioned substantially in alignment with the bottom surface 70 of the ring band portion 66. The ring band support surface 160 extends radially inward from the outer extremity 140 a preestablished distance and has an inner diameter 162 being axially aligned with the ring cooling surface 110 of the cooling side 50 of the head member 42. The ring band support surface 160 has a preestablished surface area being substantially equal to that of the preestablished surface area of the bottom surface 70 of the head member 42. A lower cooling surface 164 extends downwardly from the inner diameter 162 at an obtuse angle to the ring band support surface 160. An axial cooling surface 166 extends downwardly from the support surface 152 at the interface of the outer diameter 150 and is axially aligned with the gallery cooling surface 112 of the head member 42. A lower arcuate cooling surface 170 connects the lower cooling surface 164 and the axial cooling surface 166. A skirt member cooling gallery 172 is defined within the lower cooling surface 164, the lower arcuate cooling surface 170 and the axial cooling surface 166. The head ring cooling gallery 116 and the skirt member cooling gallery 172 combined define a piston cooling gallery 180. Extending downwardly from the inner diameter 158 of the first surface 156 and at an angle to the first surface 156 is a crater underside cooling surface 182.

The strut portion 132 extends from the lower surface 146 to a predetermined distance defined by the upper extremity of the radius of the bore 148. The bore 148 is positioned in the strut portion 132 of the skirt member 44 and defines a preestablished material thickness designated as "MT". "MT" is defined between the lower surface 146 and the radius of the bore 148. The inner extremity 142, with the strut portion 132 and the base portion 134 connected extends from the lower surface 146 upwardly past the thickness "MT", through the bore 148, and exits near the crater underside cooling surface 182. The inner extremity 142 is defined by a pair of tapered sides 190. The tapered sides 190 extend from the lower surface 146 to the point of intersection of the undercrown cooling surface 118 with the inner extremity 142. A radiused portion 192 connected the respective tapered sides 190 and the underside cooling surface 182, and define the remainder of the inner extremity 142. The pair of radiused portions 192 intersect with the piston cooling gallery 180. A coolant inlet 194 and a coolant outlet 196 are defined in the support portion 144. A snap ring groove 198, having a preestablished thickness and depth, is positioned in each end of the bore 148. And, a snap ring 200 is removably positioned in the snap ring groove 198.

The head member 42 is formed from steel by preferably a forging process or, as an alternative, a casting process in a conventional manner. A portion of the head member 42 features, such as, the bottom surface 70, the rough cut plurality of ring grooves 74, the support portion 90, and the head ring cooling gallery 116 are premachined. And, the skirt member 44 is formed from steel by preferably a forging process or a casting process in a conventional manner. A portion of the skirt member 44 features, such as, the mating portion 149, the bore 148 and the ring band support surface 160 are premachined. Thus, the head member 42 and the skirt member 44 are ready to be assembled to form the two piece unitary piston 30. Initially the support portion 90 of the head member 42 is positioned in alignment with the mating portion 149 of the skirt member 44. For example, the intermediate diameter 96 of the head member 42 is aligned with the intermediate diameter 154 of the skirt member 44 and the head member 42 is pressed onto the skirt member 44. Thus, the support surface 98 of the head member 42 is in contacting and supporting relationship with the support surface 152 of the skirt member 44. In this application, a gap 202 is positioned between the first surface 94 of the head member 42 and the first surface 156 of the skirt member 44. With the support surface 98 of the head member 42 in contacting and supporting relationship with the support surface 152 of the skirt member 44, the bottom surface 70 of the head member 42 is in contacting and supporting relationship with the ring band support surface 160 of the skirt member 44. At this time, the interface between the bottom surface 70 of the head member 42 and the ring band support surface 160 of the skirt member 44 are fixedly connected by a welding process 204 completing the formation of the two piece unitary piston 30.

Figure 5:
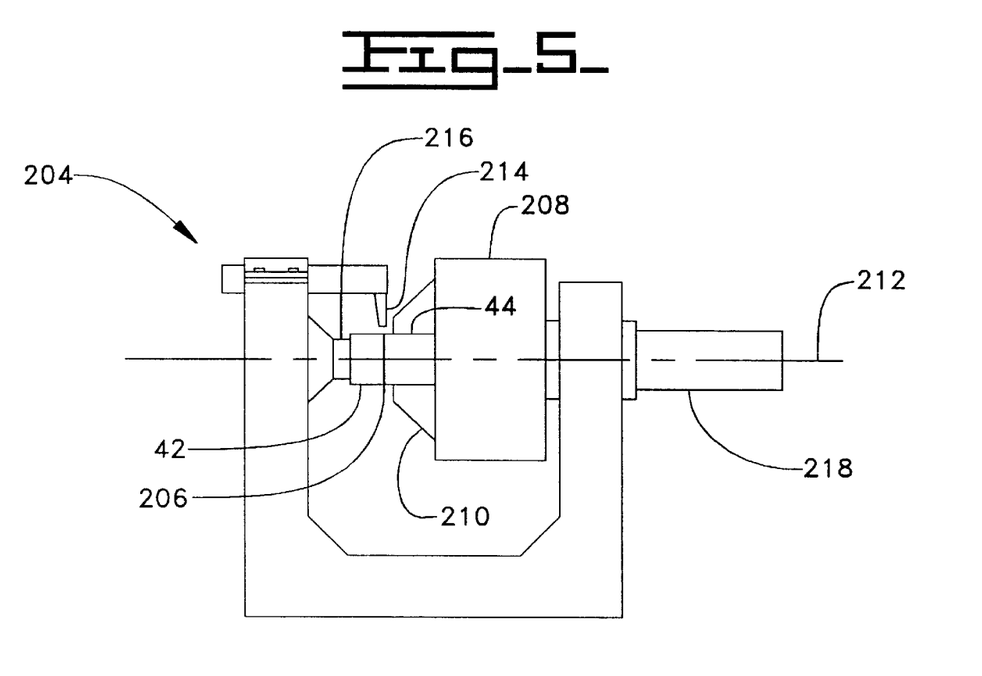
FIG. 5 is a side view of a machine for making the two piece unitary piston.

In this application, as shown in FIG. 5, the welding process 204 is defined to be a diffusion bonding weld 206 taking place in a vacuum. As an alternative, the welding process could include other types of welding, such as, a brazing weld, an electron beam weld or a laser weld. In operation, the head member 42 and the skirt member 44 are preassembled, the head member 42 is pressed onto the skirt member 44. The preassembled components are positioned in a head stock 208 and a plurality of centering jaws 210 are adjusted to center the axis 32 about a machine axis 212. With the axis 32 and the axis 212 aligned a welding head 214 is aligned with the interface of the bottom surface 70 of the head member 42 and the ring band support surface 160 of the skirt member 44 and are welded by the welding head 214. In this application, the preassembled head member 42 and the skirt member 44 are rotated and the welding head 214 remains stationary. As an additional measure to insure the contacting and supporting relationship of the bottom surface 70 of the head member 42 and the ring band support surface 160 of the skirt member 44 the preassembled head member 42 and the skirt member 44 are maintained in contacting relationship against a rotatable abutting member 216 by a hydraulic cylinder 218. Other methods and step of welding could be employed without changing the essence of the invention.

And, after the welding step, the resulting two piece unitary piston 30 is finished machined in a conventional manner.

It should be understood that the position and location of the support surface 98 on the head member 42 and the respective support surface 152 on the skirt member 44 can be varied without changing the essence of the invention. Additionally, the position and location of the intermediate diameter 96 on the head member 42 and the respective intermediate diameter 154 on the skirt member 44 can be varied without changing the essence of the invention. Furthermore, the axial relationship of the support surface 98 and the bottom surface 70 on the head member 42 can be varied without changing the essence of the invention.

INDUSTRIAL APPLICABILITY

In use, the engine 10 is started. Fuel is supplied to each of the plurality of cylinders 14 by the fuel system 38. Combustion occurs and the two piece unitary piston 30 has the force applied thereon and the stresses applied thereto. For example, as illustrated in FIG. 1, and shown by the arrows 52, the force causing the stress is shown. As is shown, a force is applied to the crown portion 60. With the support portion 90 being in contacting and supporting relationship to the mating portion 149 forces applied to the head member 42 is transferred through the base portion 134 to the wrist pin 36 and the connecting rod 34. Additional force results in a moment about the axis 32. With the supporting structure of the skirt member 44 having substantially the same structural strength as the head member 42 and the ring band supporting surface 160 being in contacting and supporting relationship with the bottom surface 70 of the ring band portion 66 any moment about the axis 32 is resisted. Thus, the structural integrity of the two piece unitary piston 30 is improved and results in increased life, longevity and decreased down time.

Additionally, with the construction of the head member 42, the preestablished thickness "T" of the ring band portion 66 is easily accessible for machining. Thus, as the lubricating and cooling oil enters the piston cooling gallery 180 through the coolant inlet 194 the lubricating and cooling oil is distributed along the ring cooling surface 110. With the preestablished thickness "T" being controlled the ring band portion 66, in which the plurality of rings 74 are positioned, is appropriately cooled. For example, as the two piece unitary piston 30 moves axially the lubricant and coolant trapped with in the cooling gallery 180 is shaken along the ring cooling surface 110, the upper arcuate cooling surface 114 and the gallery cooling surface 112 of the head ring cooling gallery 116, and the lower cooling surface 162, the lower arcuate cooling surface 170 and the axial cooling surface 164 of the skirt member cooling gallery 172. Thus, the life of the two piece unitary piston 30 is increased. After cooling the ring band portion 66, the hot oil escapes the oil cooling gallery 180 through the coolant outlet 196 and is recirculated in a conventional manner.

Additional lubricant and coolant is directed along the undercrown cooling surface 118 and with the crater underside cooling surface 182 being at an angle to the first surface 156, lubricant and coolant is directed to the interface of the wrist pin 36 and the connecting rod 34. For example, as the lubricant and coolant is directed along the frustoconical configuration the lubricant and coolant strikes the cone member 122 and flows toward the base member 120. As the lubricant and coolant exits from the base member 120 the lubricant and coolant comes in contact with the crater underside cooling surface 182 and is directed to the interface of the wrist pin 36 and the connecting rod 34. Thus, the flow of lubricant is improved with the structural configuration of the two piece unitary piston 30.

The two piece unitary piston 30 is easily manufactured. For example, the structural configuration of the head member 42 and the skirt member 44 can be easily rough and finished machined. The structural integrity is improved with the use of materials having the same structural integrity. Bending forces are resisted and increased life is made available with the structural configuration of the two piece unitary piston 30 welded structure. Additionally, with the stepped configuration of the support portion 90 and the stepped configuration of the mating portion 149 resulting in the press fitted alignment, and the contacting and supporting relationship, forces are transferred to the wrist pin 36 and connecting rod 34 in an effective manner. Furthermore, any difficulty of welding the joint at the stepped interface is eliminated reducing cost. And, with the interface of the ring band support surface 160 and the bottom surface 70 being welded the head member 42 and the skirt member 42 are fixedly attached.

Other aspects, objects and advantages of this invention can be obtained from a study of the drawings, the disclosure and the appended claims.

What is claimed is:

1. A two piece unitary piston being adapted for use with an engine, said two piece unitary piston comprising:

a head member being made of a material having a preestablished material strength, having a crown portion to which is connected a ring band portion defining a bottom surface, a support portion defining a support surface having a preestablished surface area, and an intermediate diameter having a preestablished value;

a skirt member being made of a material having a preestablished material strength being substantially the same as the preestablished material strength of said head member, having a ring band support surface being aligned with the bottom surface forming an interface, a mating portion defining a support surface being in contacting and supporting relationship with said support surface of said head member and an intermediate diameter having a preestablished value;

said intermediate diameter of said head member and said intermediate diameter of said skirt member forming an interference fit; and said interface formed by said ring band support surface being aligned with said bottom surface being joined by a welding process.

2. The two piece unitary piston of claim 1 wherein each of said head member and said skirt member are made of steel.

3. The two piece unitary piston of claim 2 wherein each of said head member and said skirt member are formed as a forging.

4. The two piece unitary piston of claim 2 wherein said head member is formed as a forging and said skirt member is formed as a casting.

5. The two piece unitary piston of claim 2 wherein said head member is formed as a casting and said skirt member is formed as a forging.

6. The two piece unitary piston of claim 1 wherein said interface of said bottom surface and said ring band support surface being radially spaced from said interface of said support surface of said head member and said support surface of said skirt member.

7. The two piece unitary piston of claim 6 wherein said bottom surface and said ring band support surface being axially spaced from said interface of said support surface of said head member and said support surface of said skirt member.

8. The two piece unitary piston of claim 7 wherein said head member defining a combustion side and said interface of said support surface of said head member and said support surface of said skirt member being closer thereto than said interface of said bottom surface and ring band support surface (160).

9. The two piece unitary piston of claim 1 further comprising a piston cooling gallery.

10. The two piece unitary piston of claim 9 wherein said piston cooling gallery includes a head ring cooling gallery being positioned within said head member and a skirt member cooling gallery being positioned within said skirt member.

11. The two piece unitary piston of claim 9 wherein said piston cooling gallery includes a coolant inlet and a coolant outlet.

12. A method of making a two piece unitary piston, said method of making comprising the steps of:

forming a head member having a bottom surface and a support portion defining an intermediate diameter;

forming a skirt member having a ring band support surface and a support portion defining an intermediate diameter;

positioning said intermediate diameter of said head member in interference fitting relationship with said intermediate diameter of said skirt member;

positioning said support surface of said head member in contacting and supporting relationship with said support surface of said skirt member;

positioning said bottom surface in contacting relationship to said ring band support surface forming an interface; and welding said interface of said bottom surface and said ring band support surface.

13. The method of making said two piece unitary piston of claim 12 wherein said step of forming said head member includes a forging operation.

14. The method of making said two piece unitary piston of claim 12 wherein said step of forming said skirt member includes a forging operation.

15. The method of making said two piece unitary piston of claim 12 wherein said step of forming said skirt member includes a casting.

16. The method of making said two piece unitary piston of claim 12 wherein said step of positioning said intermediate diameter of said head member in interference fitting relationship with said intermediate diameter of said skirt member includes a press fit.

17. The method of making said two piece unitary piston of claim 12 wherein said step of welding said interface of said bottom surface and said ring band support surface includes a diffusion bonding weld.

18. The method of making said two piece unitary piston of claim 12 wherein said step of welding said interface of said bottom surface and said ring band support surface includes an electron beam weld.

19. The method of making said two piece unitary piston of claim 12 wherein said step of welding said interface of said bottom surface and said ring band support surface includes a laser weld.

20. The method of making said two piece unitary piston of claim 12 wherein said step of positioning said support surface of said head member in contacting and supporting relationship with said support surface of said skirt member includes forcing said head member and skirt member together during said welding step.

* * * * *